United States Patent [19]

Kyrtsos et al.

[11] Patent Number: 4,866,419
[45] Date of Patent: Sep. 12, 1989

[54] METHOD FOR DETECTING AN UNDERINFLATED TIRE BY MONITORING A WORK VEHICLE SUSPENSION

[75] Inventors: Christos T. Kyrtsos, Peoria, Ill.; Gregory E. Long, Manhattan, Kans.

[73] Assignee: Caterpillar Inc., Peoria, Ill.

[21] Appl. No.: 232,839

[22] PCT Filed: Oct. 13, 1987

[86] PCT No.: PCT/US87/02603
§ 371 Date: Nov. 3, 1987
§ 102(e) Date: Nov. 3, 1987

[87] PCT Pub. No.: WO88/03878
PCT Pub. Date: Jun. 2, 1988

Related U.S. Application Data

[63] Continuation-in-part of Ser. No. 935,870, Nov. 28, 1986, Pat. No. 4,744,239.

[51] Int. Cl.[4] .............................................. B60C 23/00
[52] U.S. Cl. ................................................... 340/443
[58] Field of Search ............... 340/58, 52 R, 443, 438; 73/146.2, 146.5

[56] References Cited

U.S. PATENT DOCUMENTS

| | | | |
|---|---|---|---|
| 3,900,828 | 8/1975 | Lage et al. | 340/58 X |
| 4,459,579 | 7/1984 | David et al. | 340/58 |
| 4,550,385 | 10/1985 | Pulk et al. | 340/58 X |
| 4,574,267 | 3/1986 | Jones | 340/58 |
| 4,635,739 | 1/1987 | Foley et al. | 177/45 |
| 4,744,239 | 5/1988 | Kyrtsos et al. | 340/52 R |

Primary Examiner—Joseph A. Orsino
Assistant Examiner—Brian R. Tumm
Attorney, Agent, or Firm—Terry D. Morgan; Robert E. Muir

[57] ABSTRACT

In the field of off-highway trucks, tires represent a significant portion of operating expenses. Underinflated tires wear more quickly than properly inflated tires. This invention pertains to an apparatus for detecting an underinflated tire of a work vehicle (12) and displaying the information to the operator or service personnel. The apparatus senses internal pressures of preselected struts (16,18), and converts these signals into an indication of relative inflation pressures of the associated tires (32). When a tire is underinflated relative to another tire by a preselected amount, an underinflation signal is transmitted to a display. The display indicates to the operator that a tire is underinflated.

15 Claims, 9 Drawing Sheets

FIG_4

FIG. 9B

METHOD FOR DETECTING AN UNDERINFLATED TIRE BY MONITORING A WORK VEHICLE SUSPENSION This application is a continuation-in-part of a prior application, Ser. No. 935,870, filed Nov. 28, 1986, now U.S. Pat. No. 4,744,239.

TECHNICAL FIELD

This invention relates generally to a method for automatically determining the condition of a work vehicle suspension, and more particularly, to a method which detects an underinflated tire by monitoring strut pressures.

BACKGROUND ART

In the field of off-highway trucks used in mining operations, for example, it is desirable that an accurate record be kept of the quantity of material removed from the mining site. This information can be used to calculate mine and truck productivity as well as aid in forecasting profitability and work schedules.

Other systems, as disclosed in U.S. Pat. No. 4,635,739 issued to D. Foley et al. on Jan. 3, 1987, have shown that strut pressure can be an accurate indicator of payload. The apparatus disclosed therein includes an electronic control which monitors each of the strut pressures, compensates for various inaccuracies introduced by load distribution and vehicle attitude, and correlates this information into actual payload. This payload information allows the truck to be operated efficiently near its maximum capacity without promoting undue vehicle wear. An overloaded vehicle hastens tire and frame damage.

Operation of the vehicle with a collapsing strut will have detrimental effects on the accuracy of the payload monitor because of the change in the relationship between strut pressure and payload. Other serious consequences also result from such operation. For example, uneven tire wear is an undesirable result of extended vehicle operation with a collapsed strut. Tires are a major operating expense of off-highway trucks and any increase in their replacement schedule impacts on profitability. Thus a collapsed strut can have economic impact other than replacement of the damaged strut. Moreover, a completely collapsed strut results in repeated metal-to-metal contact which can cause frame damage in relatively short periods of operation. Resultant repair costs are exorbitant.

Operation of the vehicle with an underinflated tire, while not necessarily causing payload inaccuracies, results in tire damage because it wears at an accelerated rate. Additionally, tires on off-highway trucks tend to have very stiff sidewalls, so visual inspection rarely detects an underinflated condition.

The present invention is directed to overcoming one or more of the problems as set forth above.

DISCLOSURE OF THE INVENTION

In accordance with one aspect of the present invention, there is provided a method for detecting an underinflated tire of a work vehicle. The pneumatic tires are mounted on a plurality of opposed wheels which are mounted on hydraulic struts. The method includes the steps of sensing the internal pressure of preselected struts and delivering a plurality of first signals each having a value responsive to the internal pressure of a respective strut. A signal indicative of relative inflation pressures of at least a portion of the tires is derived in response to the first signals. The relative inflation pressure signal is compared with a preselected setpoint, and an underinflation signal is delivered in response a preselected difference between the compared signals.

In accordance with another aspect of the present invention, the step of deriving a signal indicative of relative inflation pressures of at least a portion of the tires includes the following steps. The first signals are converted to second signals, each responsive to the axial displacement of a respective strut. Preselected second signals are compared one with another. A signal indicative of relative inflation pressures of associated tires is delivered in response to the compared second signals.

In accordance with yet another aspect of the present invention, the step of driving a signal indicative of relative inflation pressures of at least a portion of the tires includes the following steps. The first signals are converted to second signals which are responsive to a kinetic energy transfer from the tires to an associated strut. Preselected second signals are compared with one another and a relative inflation pressure signal is delivered in response to the comparison.

In accordance with a further aspect of the present invention, the step of deriving a signal indicative of relative inflation pressures of at least a portion of the tires includes the following steps. The slopes of selected portions of preselected first signals are determined and compared one with another. A signal indicative of relative inflation pressures of associated tires is delivered in response to the compared signals.

In accordance with a still further aspect of the present invention, the step of deriving a signal indicative of relative inflation pressures of at least a portion of the tires includes the following steps. Maximums and minimums of selected portions of preselected first signals are determined and compared with each other. A signal indicative of relative inflation pressures of associated tires is delivered in response to the comparison.

In accordance with a yet further aspect of the present invention, a method detects an underinflated tire of a work vehicle which has pneumatic tires. The tires are mounted on a plurality of opposed wheels which are mounted on hydraulic struts. The method includes the steps of sensing the internal pressure of each of the struts and delivering a plurality of first signals each having a magnitude correlative to the internal pressure of each respective strut. Consecutive first signals from each respective strut are compared, and a second signal having a magnitude correlative to the differential therebetween is delivered. The number of second signals exceeding a preselected setpoint during a preselected time are counted. The count for a strut is compared to the count of another strut, and a third signal having a magnitude responsive to the count differential is delivered. A signal indicative of an underinflated tire is delivered in response to the count differential exceeding a preselected setpoint.

BEST MODE FOR CARRYING OUT THE INVENTION

Figure 1:
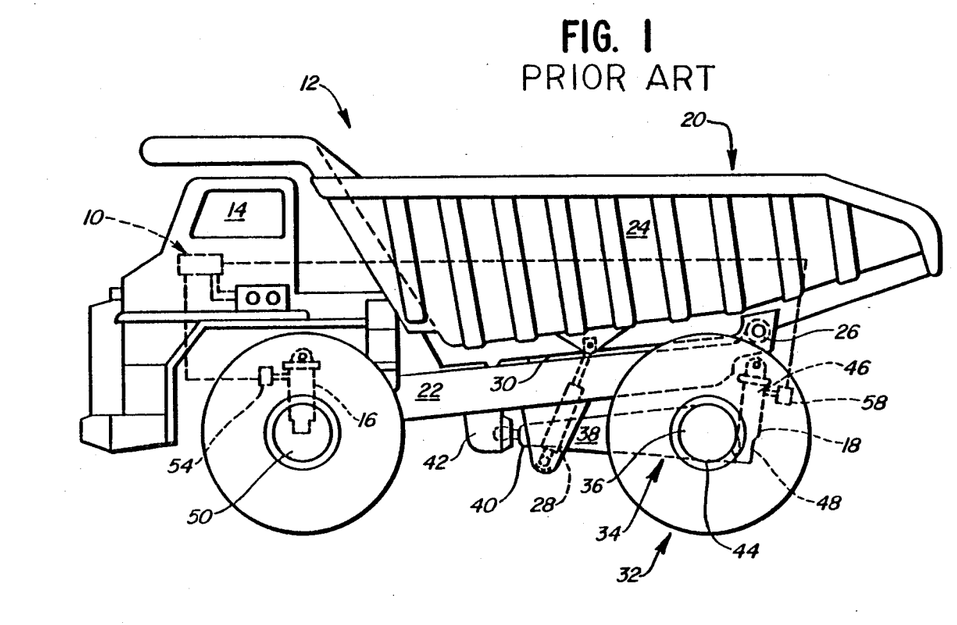
FIG. 1 is a diagrammatic view of an off-highway truck and shows the location of critical suspension components.

The drawings show a preferred embodiment of the present apparatus 10. FIG. 1 shows the apparatus 10 as applied on a prior art work vehicle 12 which can be, for example, an off-highway truck 14. The truck has at least one front and rear strut 16,18 disposed in supporting relation to a load carrying portion 20. The preferred embodiment has two front and two rear struts 16L,16R,18L,18R which are the gas-over-liquid type commonly known in the industry and not described herein. It is sufficient in the understanding of the instant apparatus 10 to recognize that the pressure of the fluid is indicative of the magnitude of the load applied to the strut 16,18, and that wide swings in the strut pressures are normal and even expected during vehicle travel, commonly referred to as "roading". Moreover, a strut which has lost pressure and collapsed shows little response to "roading" with significantly less variation in strut pressure. Conversely, a severely underinflated tire will increase the frequency of the strut pressure variations within the strut supporting that tire. The underinflated tire has a lower spring coefficient than a properly inflated tire and will resultantly increase the oscillatory response of the suspension with corresponding variations in the strut pressure.

The load carrying portion 20 includes a vehicular frame 22 and dump body 24. The dump body 24 is connected to the frame 22 by pivot pin 26 and a hydraulic cylinder 28. The contents of the dump body 24 can be removed by controllably pressurizing the hydraulic cylinder 28 to effect pivotal movement of the dump body 24 about the pivot pin 26. In the transport mode, the cylinder 28 is not pressurized and the weight of the dump body is transferred to the frame through the pivot pin 26 and a support pad 30 fixed to the frame 22.

The work vehicle 12 further includes a ground engaging portion 32, such as a tire. A suspension means 34 supports the load carrying portion 20 in a manner to provide damped oscillatory motion between the ground engaging portion 32 and the load carrying portion 20. The suspension means 34 includes a rear axle housing 36 and an A-frame moment arm 38. The A-frame moment arm 38 has a first end portion 40 pivotally connected to the vehicular frame 22 by a socket 42, and a second end portion 44 fixedly connected to the rear axle housing 36. The first end portion 40 of the A-frame moment arm 38 is a king bolt arrangement, substantially spherical in shape and retained from lateral movement by the socket 42. The rear strut 18 has a first end portion 46 pivotally connected to the vehicular frame 22 and a second end portion 48 pivotally connected to the second end portion 44 of the A-frame moment arm 38.

During loading of the truck, as the payload increases, the load carrying portion 20 will be displaced in a direction toward the ground engaging portion 32. The rear strut 18 begins to compress while the A-frame moment arm 38 pivots about first end portion 40. A distance L2 is defined to be the distance between the first end portion 40 pivot point and the second end portion 44 pivot point of the arm 38. Therefore, it can be shown that the rear strut pressure differential is a function of the suspension means 34. Moreover, the rear strut pressure differential can be related to the reaction force R between a work surface and the ground engaging portion 32. A force S experienced by the rear strut 18 can be determined by measuring the internal pressure of the strut 18, subtracting the rear strut pressure corresponding to an unloaded truck, and multiplying the differential pressure by the area of the strut 18. A reaction force R is proportional to the payload of the vehicle 12 and can be assumed to act through the center of the rear axle housing 36 such that a summation of the moments about the pivot point of the king bolt would derive the following equation:

$$\text{(eqn. 1)} \quad R = S*L2/L3$$

where the horizontal distance between the first end portion 40 pivot point and the center of rear axle housing 36 is defined to be L3.

Similarly, the front strut 16 will be compressed as the load increases; however, the front strut is connected directly between the frame 22 and a front axle housing 50. A more straightforward relationship exists here in that a force F experienced by the front strut 16 can be determined by measuring the internal pressure of the strut 16, subtracting the front strut pressure corresponding to an unloaded truck, and multiplying the pressure by the area of the strut 16. The reaction force F between the ground engaging portion 32 and the work surface is substantially equivalent to the force F experienced by the front strut 16.

Of course, the above conditions apply to a particular truck design. It is understood that other chassis configurations may be used. The previous discussion merely sets forth the manner by which the chassis configuration effects the force as it relates to strut pressures.

Figure 2:
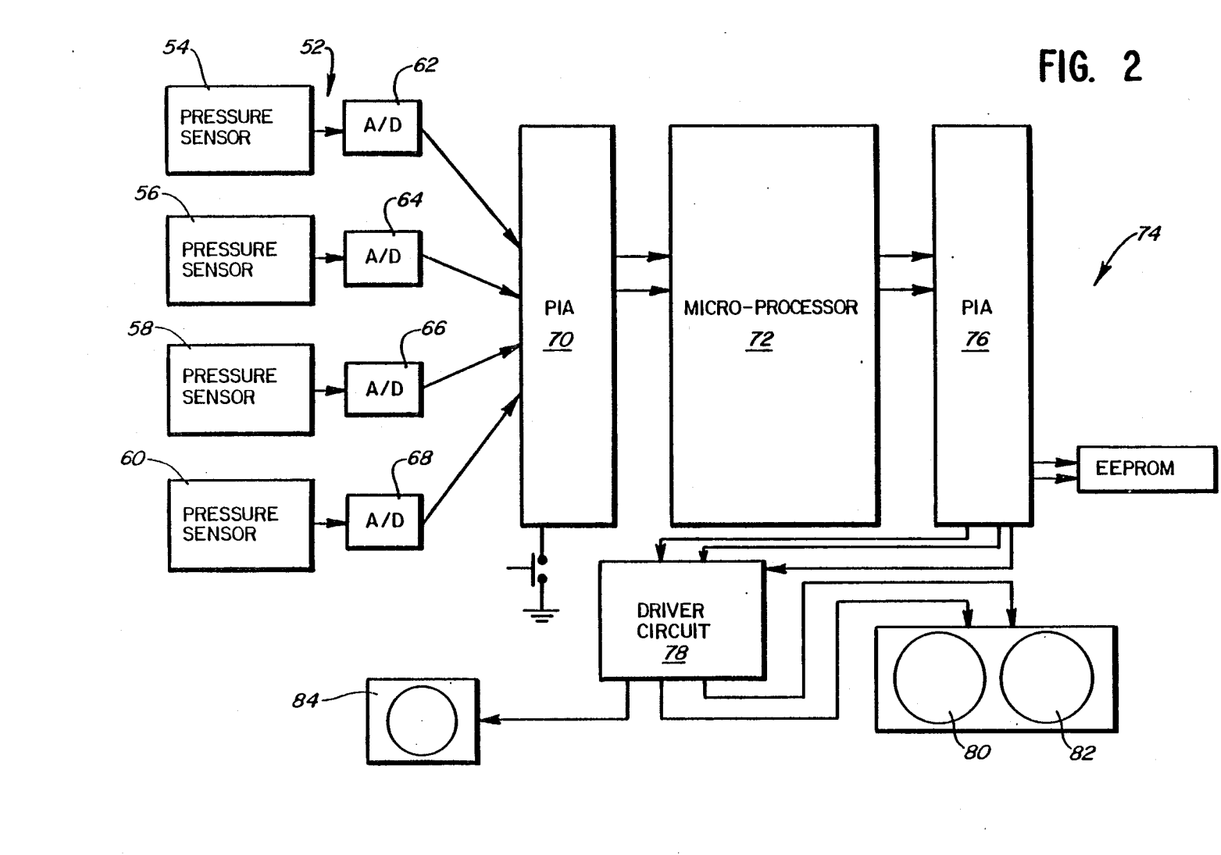
FIG. 2 is a block diagram of a preferred embodiment of an apparatus for monitoring the suspension.

The apparatus 10 is shown in FIG. 1 to illustrate its location on the work vehicle 12. A more detailed block diagram of the apparatus 10 is shown in FIG. 2 and illustrates means 52 for sensing the pressures of each of the struts 16,18 and delivers a plurality of signals each having a value responsive to the internal pressures of a respective strut. The means 52 includes a plurality of pressure sensors 54,56,58,60 of a type commercially available. The pressure sensors 54,56,58,60 are respectively associated with the two front struts 16L,16R and the two rear struts 18L,18R. Each of the pressure sensors 54,56,58,60 delivers an analog signal proportional to the magnitude of the pressure of the respective strut 16L,16R,18L,18R to respective analog to digital converters (A/D) 62,64,66,68. The A/D's 62,64,66,68 are commercially available. Other types of A/D converters have been contemplated and the choice of the particular A/D is a matter of designer discretion. The selection of a device which provides an analog to frequency output is particularly well suited to the digital microprocessor environment disclosed herein; however, other similar devices could be substituted without departing from the spirit of the invention.

A programmable interface array (PIA) 70 receives the digital frequencies output by the A/D converters 62,64,66,68 and delivers these signals to a microprocessor 72 under software control. The apparatus 10 also includes means 74 for receiving the control signal and delivering an indication of the magnitude of the work vehicle payload in response to the magnitude of the control signal. The indicating means 74 includes a second PIA 76 connected through a driver circuit 78 to a pair of individually energizable incandescent lamps 80,82. These lamps 80,82 are used to give indication to both the truck operator and the operator of the loading equipment of the status of the load relative to rated truck capacity.

A third incandescent lamp 84 is connected to the PIA 76 via the driver circuit 78. The third lamp 84 is addressable by the microprocessor 72 to indicate either a collapsed strut or an underinflated tire and can be viewed primarily by the truck operator.

Figure 3:
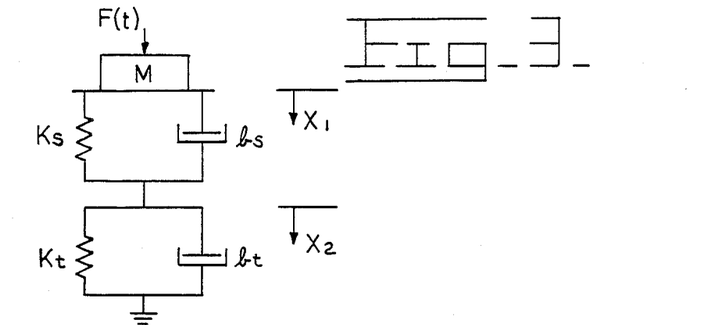
FIG. 3 illustrates a mathematical model of a strut and tire suspension system.

Referring now to FIG. 3 wherein a model of a single strut-tire suspension system is shown. The mass M represents the portion of the mass of the truck being supported by a strut-tire system. The strut is modeled by a spring constant $K_s$ in parallel with a damping constant $b_s$. $X_1$ represents the linear displacement of the strut, which is 0 at rest and oscillates both positively and negatively during loading or travel. The tire is shown in series with the strut. The tire is modeled by a spring constant $K_t$ in parallel with a damping constant $b_t$. $X_2$ represents the linear displacement of the tire, which is 0 at rest and oscillates principally positively during loading or travel. F(t) is a forcing function exerted either on the mass M or on the tire, and is transferred to and partially absorbed by the suspension. This model produces the following equation:

$$F(t) = m\, d^2X_1/dt^2 + K_s(X_1 + X_2) + b_s(dX_1/dt - dX_2/dt) + K_t X_2 + b_t\, dX_2/dt \quad \text{(eqn. 2)}$$

where:
F(t) is the total force with respect to time;
Since $K_t >> K_s$ and $b_s \approx b_t$, the equation reduces to:

(eqn. 3) $F(t) = m\, d^2X_1/dt^2 + K_t X_2 + K_s X_1 + b_s dX_1/dt$

Since $X_1$ oscillates both positively and negatively, the average displacement, velocity, and acceleration when summed over a preselected period of time goes to zero, rendering the equation:

(eqn. 4) $F_{avg} = \Sigma F(t) = \Sigma X_2 K_t$

This equation gives an indication that a change in the sensed force is attributable to a change in the condition of the tire. Battelles equation (eqn. 5) $\Delta X = K\, (1/p(t))^{5/7}$ where:
X is the axial displacement of a strut from a preselected reference;
K is a constant associated with a type of strut; and
p(t) is the internal pressure of a strut at a time t;
relates strut pressure to axial displacement of the strut.

From the above calculations, the axial displacement shown in equation 5 is related to the model using the following intuitive equation.

(eqn. 6) $\Sigma \Delta X = \Sigma X_1 - \Sigma X_2$

As shown previously, the sum of $X_1$ goes to zero after a preselected period of time, which leaves eqn. 5 dependent on the change in $X_2$. Therefore, the strut pressures for a properly charged strut can be related to the condition of the associated tires using the above assumptions and equations, and the methods which follow.

Each of the methods detects an underinflated tire of a work vehicle having pneumatic tires mounted on a plurality of wheels, which are mounted on hydraulic struts 16,18. The internal pressure of preselected struts is sensed, and a plurality of first signals are delivered each having a value responsive to the internal pressure of a respective strut 16,18. A signal indicative of relative inflation pressures of at least two tires is derived in response to the first signals. The relative inflation pressure signal is compared to a preselected setpoint signal, and an underinflation signal is delivered in response to a preselected difference between the compared signals.

Calculations and decisions are programmed into the apparatus 10. These programs can be modified to accommodate different types of struts, tires, and vehicles without departing from the spirit of the invention.

Strut Displacement Method

The following method for detecting an underinflated tire is based on the changing displacement of preselected struts. As shown above in the description relating to FIG. 3, the axial displacement of a strut is related to the force exerted on it via the tire. Therefore, by monitoring the strut pressures and converting them to signals responsive to the axial displacement of the strut, an indication of relative inflation pressures of the tires is derived.

Figure 4:
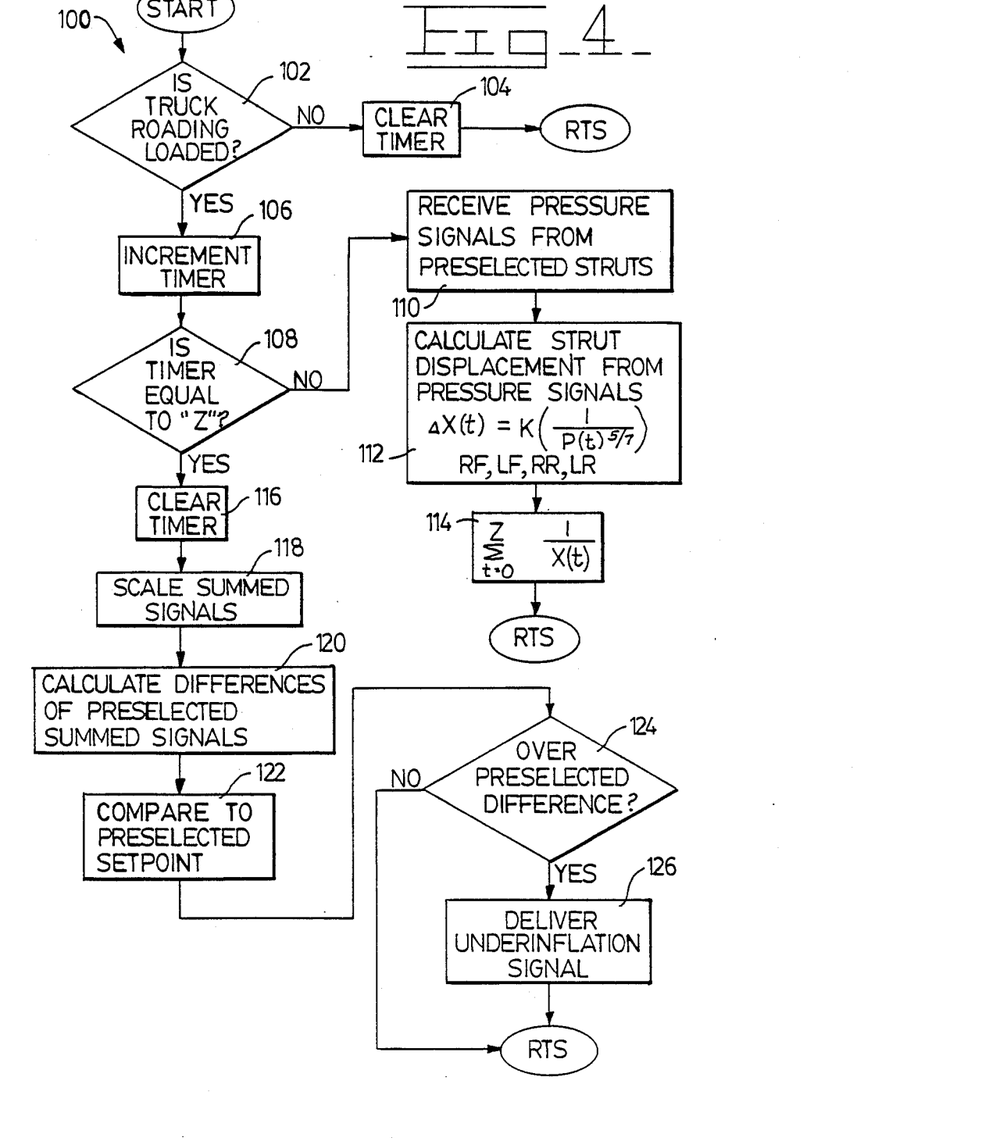
FIG. 4 is a portion of one software flowchart for implementing the suspension monitor.

FIG. 4 is a flowchart showing the progression of the Strut Displacement Method 100. Typically, the microprocessor 72 receives the signals from the sensors 54,56,58,60 through the A/D converters 62,64,66,68 and the PIA 70. A decision block 102 determines whether or not the truck is traveling and loaded. This determination can be made in a number of ways, but in this embodiment, it is made as disclosed in U.S. Pat. No. 4,635,739 issued to Foley et al. on Jan. 3, 1987. For instance, a speed pickup on the transmission of a vehicle delivers a signal to the microprocessor 72 indicative of vehicle speed, and means 74 delivers a signal indicative of payload. Alternatively, the strut pressures are monitored for a preselected period of time. If they remain fairly stable above a preselected threshold during that period, then the truck is assumed to be stationary and loaded. If the truck is not traveling and loaded, then control passes to a block 104 which clears a timer. If the truck is traveling and loaded, then control passes to a block 106, and the timer is incremented. Control passes to a decision block 108 to determine if the timer is equal to a preselected count, designated by the variable 'Z'. The preselected count 'Z' corresponds to a preselected time, during which strut pressure (first) signals will be received, converted, and stored.

If the contents of the timer are less than 'Z', a plurality of first signals are received by a block 110, each signal having a value responsive to the internal pressure of a respective strut 16,18. The signals are passed to a block 112, where preselected first signals are converted to second signals, each responsive to the displacement of a respective strut 16,18. In the preferred embodiment the formula shown in the block 112 is used, but other formulas offer a similar conversion. This formula converts a strut pressure signal into a displacement signal, X(t), related to the distance between the ends of a respective strut 16L,16R,18L,18R at a given time. As shown in the formula, p(t) is the internal pressure of the strut at a given point in time. The constant K is a function of the type of struts being used. As can be seen from the equation, pressure signals are used to determine a change in axial strut displacement, from a preselected reference point adjusted to zero, of a given strut in a given time period.

After each preselected first signal is converted into a second signal, control passes to the block 114 where the signals are stored in a summation of like signals. In other words, all of the signals from a respective strut are summed together. The displacement signals are summed over a period of time in order to obtain a mean indication of the displacement of a preselected strut with respect to the displacement of another preselected strut. This compensates for fluctuations of displacement which may occur over very short periods of time. In practice, second signals are summed for 240 seconds, but the time varies depending on the accuracy requirements desired. Control then passes back to the start, and the loop repeats.

When the timer equals 'Z', the timer is cleared in a block 116. Control passes to a block 118 where the summed second signals from the block 116 are scaled. The scale factors shown are indicative of the road condition over which the tires are traveling. For example, the following equation scales the summed displacement of the left front strut to the road conditions on the right side of the vehicle.

$$\frac{(RF - RR) LF}{LF - LR} = LFscaled \quad (eq. 7)$$

where:

RF, LF, RR, LR are sums of the second signals from the right front strut 16R, left front strut 16L, right rear strut 18R, and left rear strut 18L, respectively.

These scale factors compensate for different road conditions, since the portion of the haul road over which the left tires travel is usually different from the portion over which the right tires travel. It should be noted that this step is included for additional accuracy, and need not be included for the successful practice of the instant invention. Other scale factors can be used to obtain similar results.

Control then passes to a decision block 120 where preselected summed second signals are compared. Preselected second signals are subtracted, the resulting difference being an indication of relative inflation pressures of the tires corresponding to the compared signals. For instance, a scaled second signal from one side of a vehicle is subtracted from an unscaled second signal from the opposite side of a vehicle. A difference indicates that one tire is underinflated relative to the other. This difference is compared to a preselected setpoint signal in a block 122. Control then passes to a decision block 124 where the difference in block 122 is compared to a preselected difference. If the absolute difference between the relative inflation signal and the preselected setpoint signal is greater than a preselected difference, then control passes to a block 126. This software generates an underinflation signal and sends it to a lamp 84. If the absolute difference between the relative inflation signal and the preselected setpoint signal is not greater than a preselected difference, then control returns to the start, and the program reexecutes. As an example, suppose that the difference between the second signals corresponds to a twelve percent difference in respective tire pressures. Also suppose that the preselected setpoint corresponds to an allowed ten percent relative inflation pressure difference. Then the control is set to detect a relative inflation pressure difference of ten percent as being indicative of an underinflated tire. If no positive difference is tolerable, then an underinflation signal is delivered, since twelve percent minus ten percent yields a difference of two percent.

Obviously from the foregoing, the timer variable, the scaling factors, and the preselected setpoint can all be modified for the desired accuracy requirements.

Kinetic Energy Method

The following method for detecting an underinflated tire is based on the following observation. An underinflated tire transfers less energy to the strut than a properly inflated tire. This is because the underinflated tire will flex more, thus absorbing more energy in the tire. By applying a known forcing function, and measuring the amount of kinetic energy in the strut, the condition of the tire or tires mounted on the strut is determined. Of course, in practice the forcing function is related to the road surface, which is unknown. Therefore, measured kinetic energies in different struts must be compared.

As is well known in the engineering arts, kinetic energy equals mass multiplied by the square of velocity, $KE = mv^2$. The total mass is determined by adding the mass of an empty truck to the mass of the added payload. The mass of the empty truck is usually specified by the manufacturer, and the mass of the payload may be calculated as disclosed in U.S. Pat. No. 4,635,739 issued to Foley et al. on Jan. 3, 1987. The velocity is the oscillatory velocity of the suspension system. For present purposes, however, it is sufficient to know that kinetic energy is proportional to the velocity squared. The total mass is not needed in order to carry out the method, but may be used to increase accuracy. Since only relative inflation pressures are to be determined, the exact kinetic energy is not required. The velocity is calculated by dividing the change in position of a strut 16,18 by the change in time.

Figure 5:
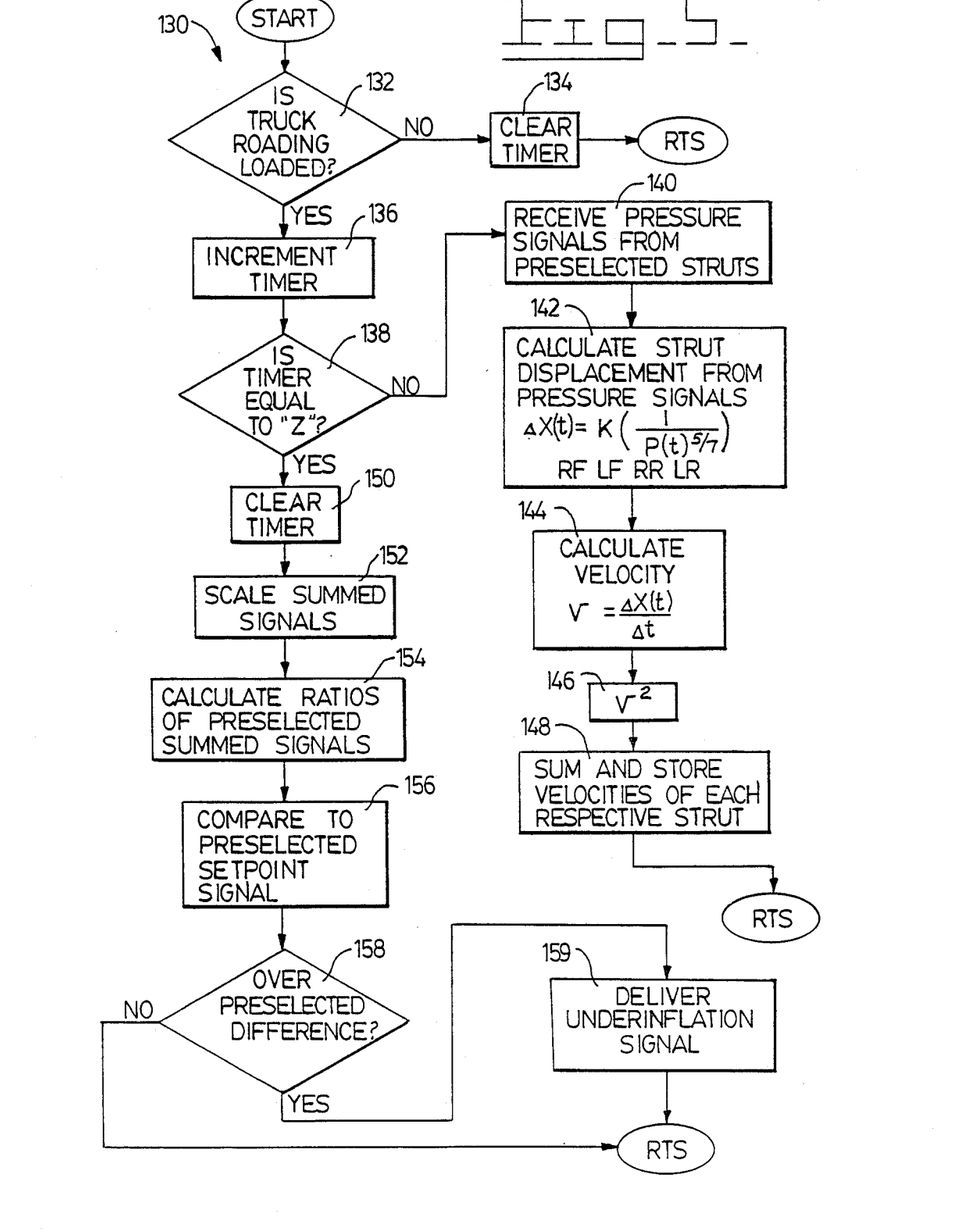
FIG. 5 is a portion of another software flowchart for implementing the suspension monitor.

Referring now to FIG. 5, the flowchart shows the progression of the Kinetic Energy Method 130. Typically, the microprocessor 72 receives the signals from the sensors 54,56,58,60 through the A/D converters 62,64,66,68 and the PIA 70. A decision block 132 determines whether or not the truck is traveling and loaded. This determination can be made in a number of ways, but in this embodiment, it is made as disclosed in U.S. Pat. No. 4,635,739 issued to Foley et al. on Jan. 3, 1987. For instance, a speed pickup on the transmission of a vehicle delivers a signal to the microprocessor 72 indicative of vehicle speed, and means 74 delivers a signal indicative of payload. If the truck is not traveling and loaded, then control passes to a block 134 which clears a timer. If the truck is traveling and loaded, then control passes to a block 136, and the timer is incremented. Control passes to a decision block 138 to determine if the timer is equal to a preselected count, designated by the variable 'Z'. The preselected count 'Z' corresponds to a preselected time, during which strut pressure (first) signals will be received, converted, and stored.

If the contents of the timer are less than 'Z', a plurality of first signals are received by a block 140, each signal having a value responsive to the internal pressure of a respective strut. Each signal is passed to a block 142, where preselected first signals are converted to second signals, each responsive to the displacement of a respective strut. In the preferred embodiment the formula shown in the block 142 is used, but other formulas offer a similar conversion. This formula converts a strut pressure signal into a displacement signal, X(t), related to the distance between the ends of a respective strut 16L,16R,18L,18R at a given time. As shown in the formula, p(t) is the internal pressure of the strut at a given point in time. The constant K is a function of the type of struts being used.

Preselected second signals pass to a block 144 where the velocities of the respective struts 16,18 are calculated from the second signals. This equation is also well known in the engineering arts, and is performed quite simply using software. Control then passes to a block 146 where the velocities of each respective strut 16,18 are squared. Each of the squared velocities are summed in a block 148 and stored in a summation of like signals. In other words, the velocities of each respective strut are summed and stored with like signals from previous sensing steps. This produces a sum corresponding to the actions of each strut over a preselected period of time. Control returns to the start.

When the timer equals 'Z', the timer is cleared in a block 150. Control transfers to a block 152 where scale factors are applied to the summed velocities from the block 148. This is used for four-wheeled vehicles to compensate for differences in haul road conditions between left and right sides of the vehicle. Control passes to a block 154 which calculates ratios from preselected scaled or unscaled signals from the previous block 152. The ratios are an indication of the relative amounts of kinetic energy received by the respective struts 16L,16R,18L,18R. The resulting signals are indicative of relative inflation pressures of the tires corresponding to the preselected struts. Several different ratios may be calculated depending on which tires are being checked for evidence of an underinflated condition. For instance, LF/RF and LF/LR are calculated to determine the condition of the left front tire. The ratios are passed to a block 156 where they are compared to a preselected setpoint signal. A difference is calculated between the relative inflation pressure signal and the setpoint signal. Control passes to a decision block 158. If the difference is outside a preselected range, then control passes to a block 159 which sends a signal to the third lamp 84 to indicate to the operator which tire is underinflated. Otherwise, control passes to the start and the loop starts over.

Extreme Pressure Difference Method

Figure 6A:
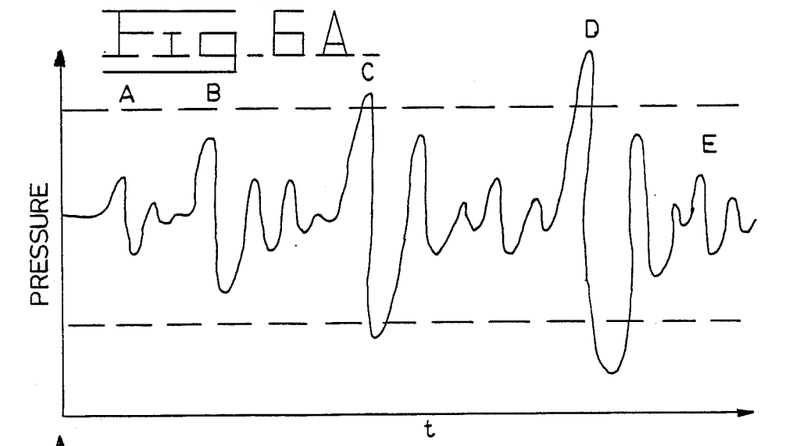
FIGS. 6A and 6B illustrate sample strut pressure waveforms.
Figure 6B:
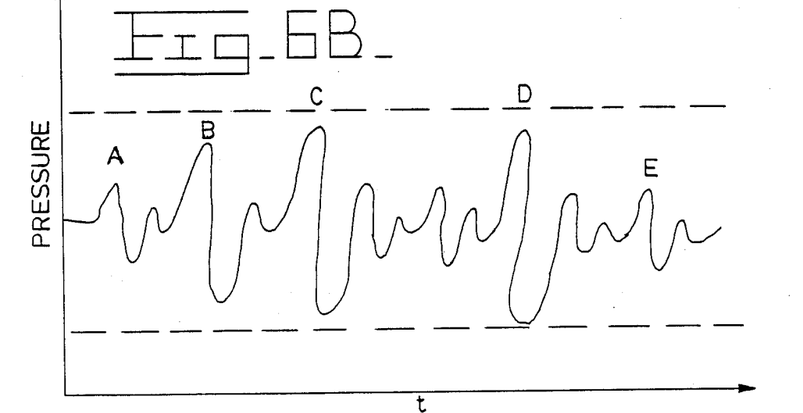

Referring now to FIGS. 6A and 6B, the following method for detecting an underinflated tire is based on the observation that as a truck tire loses nitrogen, it flexes and absorbs more energy above a certain force threshold. The force threshold is the force required to flex the tire. Off-highway truck tires have very stiff sidewalls, denoted in FIG. 3 as $b_t$. $K_t$ is dependent on the amount of air or nitrogen in the tires, and $K_t$ decreases as the tire becomes underinflated. When the forces encountered by the tire are too small to flex the sidewall, they are transferred through the tire to the strut. When larger forces are encountered, they are absorbed by the tire as it flexes. A properly inflated tire flexes less than an underinflated tire, so it transmits more energy to the strut above the force threshold, as shown in FIG. 6A. It is apparent from the foregoing discussion that a properly inflated tire causes its associated strut to have higher peak pressures, since it is receiving more energy. Likewise, an underinflated tire causes its associated strut to have lower peak pressures, as shown in FIG. 6B. Pressure peaks, associated with preselected tires, that are outside of a preselected pressure range are counted to determine whether a tire is underinflated. A strut having significantly lower peak pressures than the others is associated with an underinflated tire.

Figure 7:
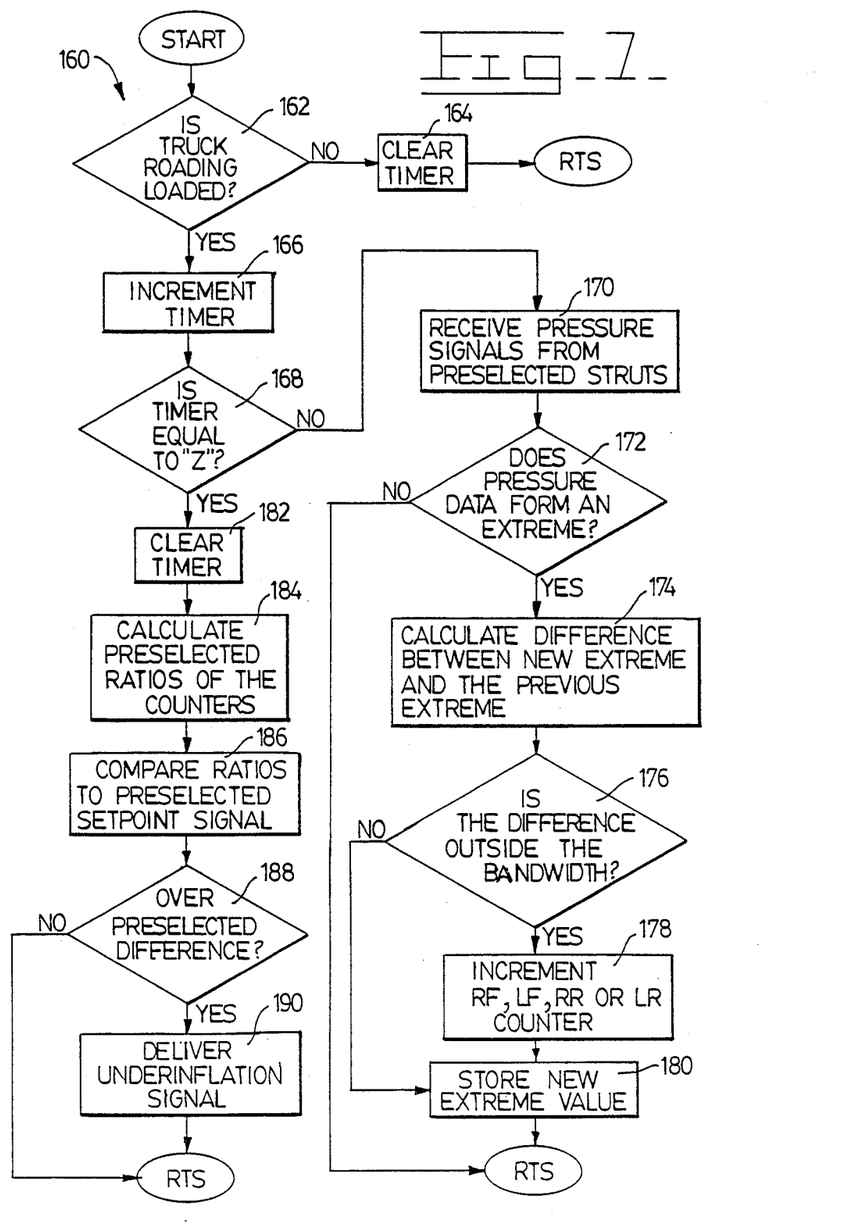
FIG. 7 is a portion of yet another software flowchart for implementing the suspension monitor.

Referring now to FIG. 7, the flowchart shows the progression of the Extreme Pressure Difference Method 160. Typically, the microprocessor 72 receives the signals from the sensors 54,56,58,60 through the A/D converters 62,64,66,68 and the PIA 70. A decision block 162 determines whether or not the truck is traveling and loaded. This determination can be made in a number of ways, but in this preferred embodiment, it is made as disclosed in U.S. Pat. No. 4,635,739 issued to Foley et al. on Jan. 3, 1987. For instance, a speed pickup on the transmission of a vehicle delivers a signal to the microprocessor 72 indicative of vehicle speed, and a means 74 delivers a signal indicative of payload. If the truck is not traveling and loaded, then control passes to a block 164 which clears a timer. If the truck is traveling and loaded, then control passes to a block 166, and the timer is incremented. Control passes to a decision block 168 to determine if the timer is equal to a preselected count, designated by the variable 'Z'. The preselected count 'Z' corresponds to a preselected time, during which strut pressure (first) signals will be received, converted, and stored.

If the contents of the timer are less than 'Z', a plurality of first signals are received by a block 170, each signal having a value responsive to the internal pressure of a respective strut. Each signal is passed to a block 172, which determines maximums and minimums of selected portions of preselected first signals. Sundry methods may be employed to accomplish this function. For instance, as a first signal is received by the block 172, the deriviative is determined. When the deriviative equals zero, then that point is a minimum or a maximum. If a first signal is at an extreme point, control passes to a block 174. The difference between this extreme point and the previous extreme point is calculated. Referring to the pressure signals shown in FIGS. 6A and 6B, it is apparent that the current extreme point is the opposite of the previous extreme point. If the current point is a maximum, then the previous extreme point was a minimum.

Next, control passes to a block 176 where the difference between extreme points is compared to a preselected bandwidth, 'B'. If the difference is outside the bandwidth, control passes to block 178 where the appropriate counter, corresponding to the preselected strut, is incremented. Otherwise, control passes to a block 180 which stores the current extreme signal in the appropriate variable. Control then passes back to the start. This loop repeats until the timer is equal to the preselected time 'Z'.

When the timer equals 'Z', the timer is cleared in a block 182. Control passes to a block 184 which calculates preselected ratios from the values in the counters of the block 178. The ratios are an indication of the relative number of pressure peaks within a preselected bandwidth of two preselected struts. The resulting signals are indicative of relative inflation pressures of the tires corresponding to the preselected struts. Several different ratios may be calculated depending on which tires are being checked for evidence of an underinflated condition. For instance, LF/RF and LF/LR are calculated to determine the condition of the left front tire. The ratios are passed to a block 186 where they are compared to a preselected setpoint signal. A difference is calculated between the relative inflation pressure signal and the setpoint signal. The difference is passed to a block 188 where it is compared to a preselected difference. If the absolute difference is greater than a preselected difference, then control passes to a block 190 which sends a signal to the third lamp 84 to indicate to the operator which tire is underinflated. Otherwise, control passes to the start and the loop starts over.

Slope Method

The following method for detecting an underinflated tire is similar to the previously described methods. As stated earlier, as a tire losses air or nitrogen, it absorbs more energy. Therefore, less energy is transferred to the strut. In the Kinetic Energy Method, velocities are calculated to determine an underinflated tire. However, velocity of the pressure signals can also be measured by the change in pressure divided by the change in time. This corresponds to the slope of the pressure signal. The Slope Method monitors the signals responsive to the internal pressure of preselected struts. Slopes of selected portions of each of the pressure signals are determined, and compared one with another. A signal indicative of relative inflation pressures of preselected tires is delivered in response to the comparison. The relative inflation pressure signal is then compared with a preselected setpoint signal, and an underinflation signal is delivered in response to a preselected difference between the relative inflation pressure signal and the preselected setpoint signal.

Figure 8:
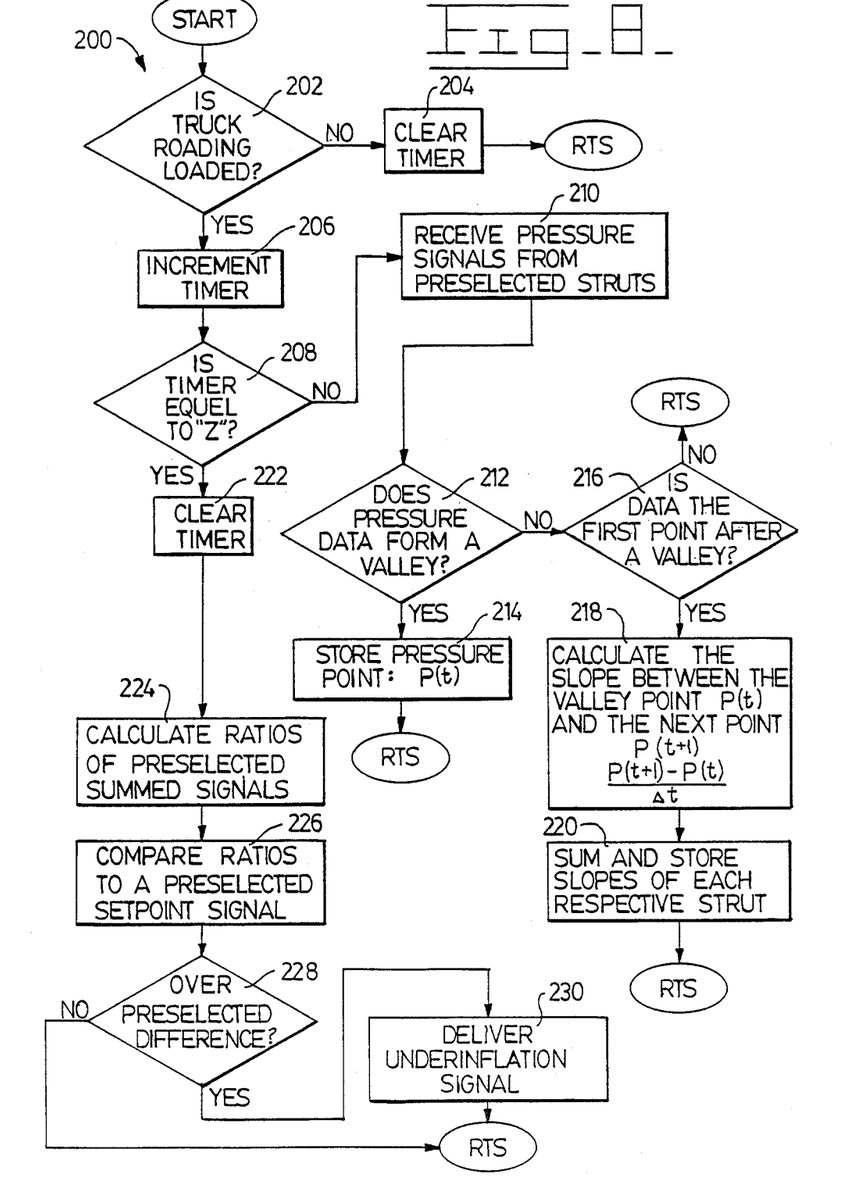
FIG. 8 is a portion of a further software flowchart for implementing the suspension monitor.

Referring now to FIG. 8, the flowchart shows the progression of the Slope Method 200. Typically, the microprocessor 72 receives the signals from the sensors 54,56,58,60 through the A/D converters 62,64,66,68 and the PIA 70. A decision block 202 determines whether or not the truck is traveling and loaded. This determination can be made in a number of ways, but in this preferred embodiment, it is made as disclosed in U.S. Pat. No. 4,635,739 issued to Foley et al. on Jan. 3, 1987. If the truck is not traveling and loaded, then control passes to a block 204 which clears a timer. If the truck is traveling and loaded, then control passes to a block 206, and the timer is incremented. Control passes to a decision block 208 to determine if the timer is equal to a preselected count, designated by the variable 'Z'. The preselected count 'Z' corresponds to a preselected time, during which strut pressure (first) signals will be received, converted, and stored.

If the contents of the timer are less than 'Z', a plurality of first signals are received by a block 210, each signal having a value responsive to the internal pressure of a respective strut. Control passes to a block 212, which determines minimums of selected portions of preselected first signals. Sundry methods may be employed to accomplish this function. For instance, as a first signal is received by the block 212, the derivative is determined. When the value of the derivative changes from negative to zero, then that point is a minimum. If a first signal is at a minimum point, control passes to a block 214. This point is stored in a variable corresponding to the associated strut for use in a subsequent loop. Then the control passes to the start and the loop runs again. If the decision block 212 determines that the first signal is not at a minimum point, control passes to a decision block 216. If the decision block 216 determines that a minimum point of a first signal had been found during the previous loop, control transfers to block 218 where the slope is calculated between the previously recorded minimum and the first point having a positive slope. It should be recognized that more points can be used to increase accuracy of the calculation, but in this embodiment only the initial slope of the pressure signal is calculated. Control then transfers to the block 220 where the slopes are summed and stored with previous slope signals from the respective struts. Then control passes to the start and the loop runs again.

When the timer equals 'Z', the timer is cleared in a block 222. Control passes to a block 223 where the summed slope signals from the block 220 are scaled. Summed signals corresponding to the same side of a vehicle are multiplied by a scale factor, thus compensating for differences in road conditions. Control passes to a block 224 which calculates preselected ratios from the values stored in the block 220. The signals from the block 220 are a summation of the slopes from the respective struts. Obviously, the lower the value of the summed slopes, the greater the likelihood that the tire or tires associated with the strut are underinflated. The ratios are indicative of relative inflation pressures of the tires corresponding to the preselected struts. Several different ratios may be calculated depending on which tires are being checked for evidence of an underinflated condition. For instance, LF/RF and LF/LR are calculated to determine the condition of the left front tire. The ratios are passed to a block 226 where they are compared to a preselected setpoint signal. A difference is calculated between the relative inflation pressure signal and the setpoint signal. The difference is passed to a block 228 where it is compared to a preselected difference. If the absolute difference is greater than a preselected difference, then control passes to a block 230 which sends a signal to the third lamp 84 to indicate to the operator which tire is underinflated. Otherwise, control passes to the start and the loop starts over.

Peak Method

The following method is similar to the Extreme Pressure Difference Method. The theory by which each of these methods operate is substantially the same as as that described in reference to FIG. 6.

Figure 9A:
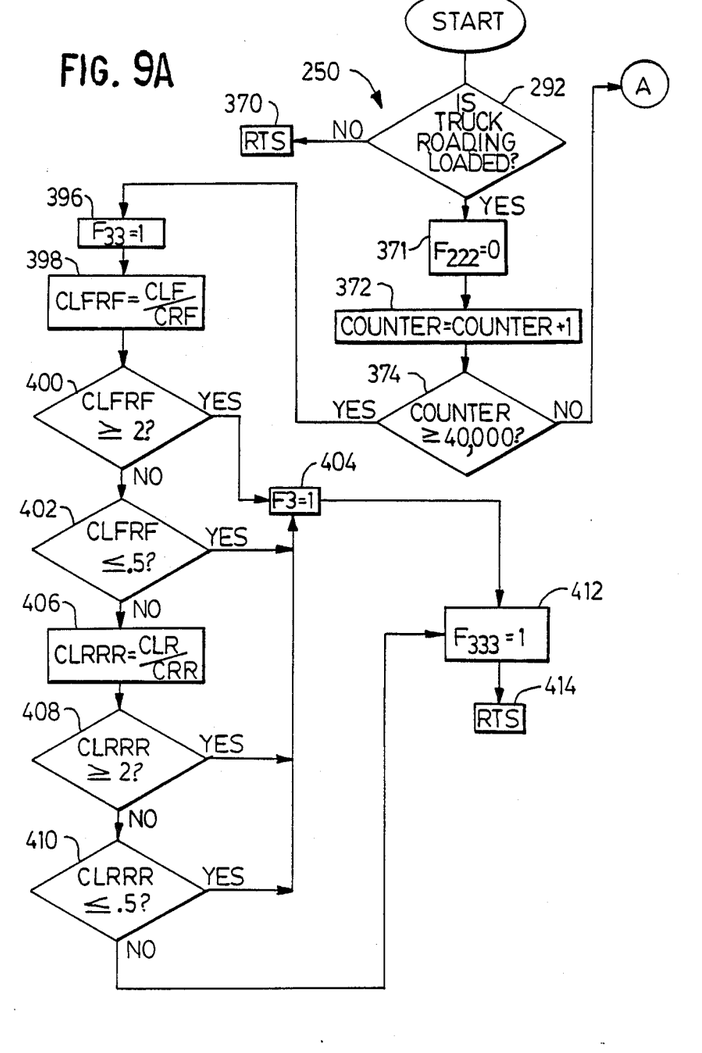
FIGS. 9A and 9B are portions of a yet further software flowchart for implementing the suspension monitor.
Figure 9B:
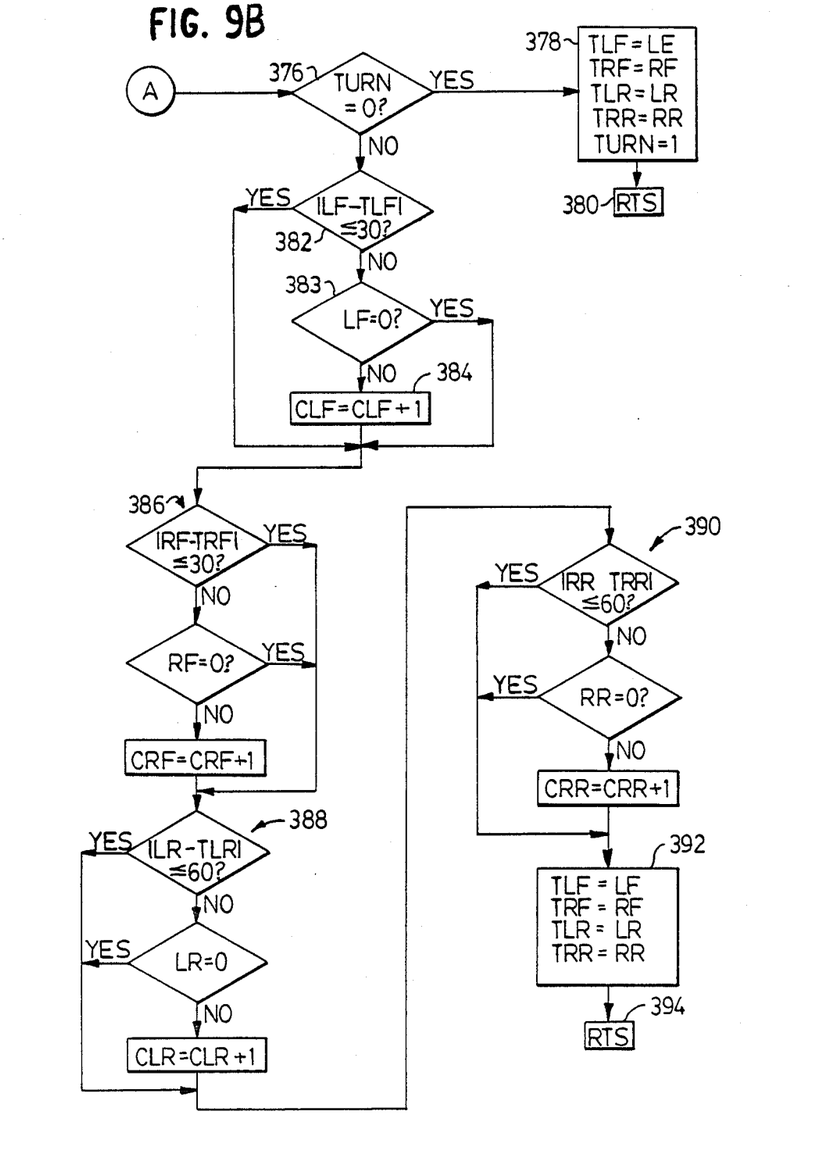

Referring now to FIGS. 9A and 9B, the flowchart shows the progression of the Peak Method 250. Typically, the microprocessor 72 receives first signals from the sensors 54,56,58,60 through the A/D converters 62,64,66,68 and the PIA 70. A decision block 292 determines whether or not the truck is traveling or loaded in a manner as described previously.

A variable COUNTER is incremented at block 72 as an indication of the elapsed roading time. Because execution loop time of the subroutines is consistent, the actual value of the variable counter is an indication of elapsed time. For example, a counter value equal to 40,000 is equivalent to an elapsed roading time of approximately 6 minutes, 40 seconds. Therefore, in decision block 374, the variable counter is compared to 40,000 and if the elapsed time is less than 6 minutes, 40 seconds, control transfers to decision block 376 when the variable TURN is compared to the value zero. If the variable TURN is equal to the value zero, then the control assumes that the software routine is on the first cycle of the Peak method subroutine and control transfers to block 378 where the variable TLF, TRF, TLR and TRR are respectively loaded with the previously detected pressures of LF,RF,LR,RR. Additionally, the variable TURN is set to the value "1" and control is returned to the main control routine via block 380. As a result of the variable TURN being set to the value "1", subsequent iterations of this routine result in decision block 376 transferring control to a decision block 382.

In the decision block 382, the left front strut pressure is compared to the previous left front strut pressure and a differential of greater than 30 psi results in a variable CLF being incremented by a value of "1". If the left front pressure differential does not exceed 30 psi, then block 384 is bypassed and the variable CLF is not incremented. Similarly, if the LF pressure is zero, then decision block 383 bypasses the block 384 and the variable CLF is not incremented. This provision prevents the variable from being incremented in the event that the strut suddenly loses pressure and collapses. Allowing the variable to be incremented when the strut is collapsed reduces the count differential and increases the possibility that the collapsed strut will go undetected. At the end of the six minute, 40 second period, the variable CLF will contain a count of the number of times the differential between two adjacent pressure readings of the left front strut exceeds 30 psi.

Control sequentially passes to blocks 386, 388 and 390 where similar operations are performed for each of the remaining strut pressures. The variables CLF, CRF, CLR and CRR each contain counts corresponding to the number of times adjacent pressure readings exceeded a 30 psi differential in the front struts and a 60 psi differential in the rear struts. In decision block 392, the previous pressure readings TLF, TRF, TLR and TRR are updated with the most recent pressure readings. Thereafter, block 394 returns control to the main control routine.

This process repeats during the peak method subroutine until such time as the counter variable value exceeds 40,000. At such time, control transfers to block 396 where the variable F33 is set to the value 1 as an indication of a completed subroutine. Control transfers to block 398 where the variable CLFRF is set equal to the ratio of the left front CLF to the right front counts CRF. If the count ratio is within the range of 0.5 to 2, then the subroutine assumes that the left and right front tires are not underinflated as they have responded similarly to similar road conditions. However, should the count ratio exceed these values, then decision blocks 400 and 402 will transfer control to block 404 where the variable F3 is set equal to the value "1" as an indication of a collapsed strut or an underinflated tire. Similarly, the count ratio of the left and right rear struts is stored in the variable CLRRR in block 406. In blocks 408 and 410, the rear count ratio is compared to the range 0.5 to 2. If the count ratio exceeds that preselected range, then control again transfers to the block 404 and the variable F3 is set to the value 1. If the rear count ratio is within the prescribed limits, then control bypasses the block 404 and transfers directly to the block 412 where the variable F333 is set to the value 1. F333 prevents the subroutine from being reexecuted absent an intervening loading cycle. Control is transferred to block 414 and ultimately returns to the main control routine.

Industrial Applicability

In the operation of vehicles, mainly off-highway trucks, underinflated tires are a major concern. Underinflated tires on automobiles result in poor handling and tracking, tire wear, and suspension deterioration. On large off-highway trucks, results are even more severe. The large tires are a major operating expense, and underinflated tires wear much more rapidly than their properly inflated counterparts. Suspension damage to a large truck caused by an underinflated tire is also very expensive to repair.

Typically, an off-highway truck has a front left and a front right tire, and a pair of rear left and rear right tires. The pair of rear tires are modeled substantially as shown in FIG. 3, with the only difference being $K_t$ and $b_t$ are modified to correspond to a dual-tired model. For identical tires, $b_t$ is approximately twice that of the single-tired model, while $K_t$ is a parallel combination of the single-tired model, $K_t^2/2K_t$.

One or more of the algorithms 100,130,160,200 are loaded into memory in the microprocessor 72. The apparatus 10 monitors the internal pressure of the struts 16L,16R,18L,18R. Preferably these algorithms are run only while the truck is loaded and traveling. This is a preferred condition for the successful practice of the instant invention, and is used to increase the accuracy of the results. Other methods of increasing the accuracy of the various algorithms include increasing the rate and time at which the strut pressures are monitored, calculating the exact mass on each strut, and the use of scale factors to compensate for irregularities between different struts or tires.

When the truck is loaded and traveling, the algorithms 100,130,160,200,250 monitor the internal pressures of the struts 16L,16R,18L,18R. These signals are modified into different parameters indicative of the pressure changes or movements of the respective struts 16L,16R,18L,18R for a preselected period of time, 'Z'. When the preselected time is reached, the respective modified signals are compared, so that the result of the comparison results in an indication of relative tire inflation pressures. To use the Kinetic Energy Method as an example, once the kinetic energy transfers are calculated for the respective preselected struts, preselected second signals are compared one with another. Ratios are calculated between preselected second signals. For instance, the second signal corresponding to the left front strut 16L is divided by the second signal corresponding to the right front strut 16R. The signal generated by the ratio is responsive to the relative inflation pressures of the left front and right front tires. For example, if the ratio equals 2, then the left front tire is transmitting twice as much kinetic energy to its strut 16L than the right front tire is transmitting to its strut 16R. This indicates that the right front tire is underinflated compared to the left front tire.

These signals are compared to a preselected setpoint signal. An underinflated tire signal is delivered in response to a preselected difference between the relative inflation pressure signals and the preselected setpoint signal. The preselected setpoint signal and preselected difference are determined on the basis of the percentage of air or nitrogen loss to be detected. Continuing with the above example, assume the preselected setpoint signal has a value corresponding to a ratio of 1, and the allowed preselected difference is 0.5 between the relative inflation pressure signal and the preselected setpoint signal. Then, when the preselected setpoint signal is subtracted from the relative inflation pressure signal, the difference is 1. Since 1 is greater than 0.5, an underinflation signal is delivered to the third lamp 84 to indicate to the operator that the left front tire is underinflated.

Other aspects, objects and advantages of this invention can be obtained from a study of the drawings, the disclosure, and the appended claims.

I claim:

1. A method (250) for detecting an underinflated tire of a work vehicle (12) having a plurality of left and right strut mounted wheels, comprising:

periodically sensing the internal pressure of each of the struts (16, 18) and delivering a plurality of first signals each having a magnitude correlative to the internal pressure of each respective strut (16, 18);

comparing consecutive first signals of each respecting strut and delivering a second signal having a magnitude correlative to the differential therebetween;

counting the number of second signals exceeding a preselected setpoint during a preselected period of time;

comparing the count for each strut (16, 18) to the count for another strut (16, 18) and delivering a third signal having a magnitude responsive to the count differential, and delivering a signal indicative of an underinflated tire in response to the count differential exceeding a preselected setpoint.

2. A method (250), as set forth in claim 1, wherein the step of comparing the count for each strut (16, 18) includes comparing the counts of the left (16L) and right (16R) front struts and comparing the counts of the left (18L) and right (18R) rear struts.

3. A method for detecting an underinflated tire of a work vehicle having pneumatic tires mounted on a plurality of opposed wheels which are mounted on hydraulic struts, comprising:

periodically sensing the internal pressure of preselected struts and delivering a plurality of first signals each having a value responsive to the internal pressure of a respective strut;

converting said first signals to a plurality of second signals by the formula:

$$\Delta X = K(1/p(t))^{5/7}$$

where:
   X is the linear displacement of the strut with respect to time;
   K is a constant related to strut configuration; and
   p(t) is strut pressure with respect to time;

summing said plurality of second signals for each preselected strut;

comparing said summed preselected second signals one with another;

delivering a signal indicative of relative inflation pressures of associated tires in response to said compared second signals; and comparing said relative inflation pressure signal with a preselected setpoint signal, and delivering an underinflation signal in response to the difference between said relative inflation signal and said setpoint signal being greater than a preselected difference value.

4. A method, as set forth in claim 3, wherein the steps of comparing said second signals and delivering said relative inflation pressures include:

multiplying preselected second signals by scale factors;

comparing preselected scaled second signals with preselected unscaled second signals; and delivering a signal indicative of relative inflation pressures of preselected tires in response to a difference between said scaled second signals and unscaled second signals.

5. A method (130) for detecting an underinflated tire of a work vehicle (12) having pneumatic tires (32) mounted on a plurality of opposed wheels which are mounted on hydraulic struts (16,18), comprising:

sensing the internal pressure of preselected struts (16,18) and delivering a plurality of first signals each having a value responsive to the internal pressure of a respective strut (16,18);

converting said first signals to second signals, each of said second signals being responsive to a kinetic energy transfer from a tire (32) to an associated strut (16,18);

comparing preselected second signals one with another and delivering a signal in response to said comparison, said signal being responsive to relative inflation pressures of preselected tires (32); and comparing said relative inflation pressure signal with a preselected setpoint and delivering an underinflation signal in response to a preselected difference between said relative inflation pressure signal and said preselected setpoint signal.

6. A method (130), as set forth in claim 5, wherein the step of comparing said second signals includes:

multiplying preselected second signals by scale factors;

comparing preselected scaled second signals with preselected unscaled second signals; and delivering a signal indicative of relative inflation pressures of preselected tires (32) in response to a difference between said scaled second signals and unscaled second signals.

7. A method (130), as set forth in claim 5, wherein the step of comparing preselected second signals includes:

repeating the steps of claim 5 a plurality of times;
   storing said second signals in a summation of like second signals from said previous sensing steps; and
   calculating a ratio of a pair of summed second signals and delivering a relative pressure signal in response to said calculation.

8. A method (130), as set forth in claim 5, wherein the step of comparing preselected second signals includes calculating a ratio of a pair of preselected second signals.

9. A method, as set forth in claim 5, wherein the step of comparing said preselected second signals includes:

calculating the ratio of the kinetic energy transmitted to the left front (16L) and right rear struts (18R);
   calculating the ratio of the kinetic energy transmitted to the right front (16R) and left rear struts (18L).

10. A method, as set forth in claim 9, wherein the step of comparing preselected second signals includes:

comparing the ratio of the kinetic energy transferred to the left front strut (16L) and the right front strut (16R) with a ratio of the kinetic energy transferred to the left front strut (16L) and the left rear strut (18L), and comparing a ratio of the kinetic energy transferred to the right front strut (16R) and the left rear strut (18L) with a ratio of the kinetic energy transferred to the right front strut (16R) and the right rear strut (18R).

11. A method (200) for detecting an underinflated tire of a work vehicle (12) having pneumatic tires (32) mounted on a plurality of opposed wheels which are mounted on hydraulic struts (16,18), comprising:

sensing the internal pressure of preselected struts (16,18) and delivering a plurality of first signals each having a value responsive to the internal pressure of a respective strut (16,18);

determining the slopes of selected portions of preselected first signals;

comparing said slopes one with another;

delivering a signal indicative of relative inflation pressures of preselected tires in response to said comparison; and comparing said relative inflation pressure signal with a preselected setpoint signal, and delivering an underinflation signal in response to a preselected difference between said relative inflation pressure signal and said preselected setpoint signal.

12. A method (200), as set forth in claim 11, wherein the step of determining includes:

monitoring each of said first signals and determining points responsive to relative low pressure points of each respective strut (16,18);

calculating the slope of each of said first signals from said relative low pressure points to respective relative high pressure points;

summing each of said calculated slopes of a respective strut for a preselected period of time;

calculating ratios of a pair of said summed slopes; and delivering signals indicative of relative inflation pressures of preselected tires in response to said calculation.

13. A method (160) for detecting an underinflated tire of a work vehicle (12) having pneumatic tires (32) mounted on a plurality of opposed wheels which are mounted on hydraulic struts (16,18), comprising:

sensing the internal pressure of preselected struts (16,18) and delivering a plurality of first signals each having a value responsive to the internal pressure of a respective strut (16,18);

determining maximums and minimums of selected portions of preselected first signals;

comparing said maximums and minimums with each other;

delivering a signal indicative of relative inflation pressures of preselected tires in response to said comparison; and comparing said relative inflation pressure signal with a preselected setpoint signal, and delivering an underinflation signal in response to a preselected difference between said relative inflation pressure signal and said preselected setpoint signal.

14. A method (160), as set forth in claim 13, wherein said step of comparing said maximums and minimums includes:

counting the number of maximums and minimums exceeding a preselected range; and comparing the counts from preselected struts one with another.

15. A method (160), as set forth is claim 13, wherein said step of comparing said maximums and minimums includes:

calculating a difference between a maximum and a minimum of a preselected first signal; and comparing said difference to a preselected range.

* * * * *